US011731023B1

(12) United States Patent
Raposo

(10) Patent No.: US 11,731,023 B1
(45) Date of Patent: Aug. 22, 2023

(54) SYSTEM AND METHOD TO IDENTIFY IMPACT LOCATIONS

(71) Applicant: Callaway Golf Company, Carlsbad, CA (US)

(72) Inventor: Mario Raposo, Carlsbad, CA (US)

(73) Assignee: Topgolf Callaway Brands Corp., Carlsbad, CA (US)

(*) Notice: Subject to any disclaimer, the term of this patent is extended or adjusted under 35 U.S.C. 154(b) by 46 days.

(21) Appl. No.: 17/534,138

(22) Filed: Nov. 23, 2021

Related U.S. Application Data

(63) Continuation of application No. 16/694,681, filed on Nov. 25, 2019, now Pat. No. 11,185,754.

(60) Provisional application No. 62/772,965, filed on Nov. 29, 2018.

(51) Int. Cl.
*A63B 69/36* (2006.01)
*G06N 3/02* (2006.01)
*A63B 24/00* (2006.01)

(52) U.S. Cl.
CPC ...... *A63B 69/3632* (2013.01); *A63B 24/0003* (2013.01); *A63B 69/3617* (2013.01); *G06N 3/02* (2013.01); *A63B 69/362* (2020.08)

(58) Field of Classification Search
CPC ............ A63B 69/3632; A63B 24/0003; A63B 69/3617; A63B 69/362; G06N 3/02
USPC ......................................... 473/223, 407, 409
See application file for complete search history.

(56) References Cited

U.S. PATENT DOCUMENTS

| | | | |
|---|---|---|---|
| 7,780,535 B2 * | 8/2010 | Hagood | A63B 53/04 463/47 |
| 2005/0037862 A1 * | 2/2005 | Hagood | A63B 60/42 473/345 |
| 2008/0146384 A1 * | 6/2008 | Hansen | A63B 60/54 473/437 |
| 2010/0292024 A1 * | 11/2010 | Hagood | A63B 60/42 473/409 |
| 2012/0052972 A1 * | 3/2012 | Bentley | A63B 60/46 473/223 |
| 2016/0322078 A1 * | 11/2016 | Bose | G01P 13/00 |
| 2017/0229154 A1 * | 8/2017 | Bose | G01P 13/00 |
| 2018/0082717 A1 * | 3/2018 | Bose | A63B 24/0062 |

* cited by examiner

*Primary Examiner* — Pierre E Elisca
(74) *Attorney, Agent, or Firm* — Michael A. Catania

(57) ABSTRACT

A golf club comprising a golf club head having a face wall, an inertial motion unit (IMU) positioned within the body, and a transceiver in communication with the IMU, a shaft attached to the golf club head, and a grip attached to the shaft is disclosed herein. The IMU identifies an impact location with a golf ball.

1 Claim, No Drawings

SYSTEM AND METHOD TO IDENTIFY IMPACT LOCATIONS

CROSS REFERENCES TO RELATED APPLICATIONS

The Present Application is a continuation application of U.S. patent application Ser. No. 16/694,681, filed on Nov. 25, 2019, which claims priority to U.S. Provisional Patent Application No. 62/772,965, filed on Nov. 29, 2018, now expired, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to impact location determination for a golf ball impacting a face of a golf club.

Description of the Related Art

Previously, tape was used to determine an impact location of a golf ball on a face of a golf club.

Inertial Measurement Units (IMUs) is a self-contained system that measures linear and angular motion usually with a triad of gyroscopes and triad of accelerometers. An IMU can either be gimballed or strapdown, outputting the integrating quantities of angular velocity and acceleration in the sensor/body frame. They are commonly referred to in literature as the rate-integrating gyroscopes and accelerometers.

BRIEF SUMMARY OF THE INVENTION

One aspect of the present invention is a method for identifying impact location on a golf club head.

Another aspect of the present invention is a golf club comprising a golf club head comprising a body having a face wall, an inertial motion unit (IMU) positioned within the body, a transceiver in communication with the IMU, wherein the IMU identifies an impact location with a golf ball.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

One embodiment is a golf club comprising a golf club head comprising a body having a face wall, an inertial motion unit (IMU) positioned within the body, a transceiver in communication with the IMU, a shaft attached to the golf club head and a grip attached to the shaft. The IMU identifies an impact location with a golf ball using a neural network.

The impact location is determined based on an impact signature immediately after a golf club head impact with a golf ball.

The collected impact datasets are associated with impact locations. A neural network learns from these dataset and then resolves impact location from any new dataset.

The golf club head mounted IMU collects impact datasets from multiple impacts of the ball at multiple locations.

Data is preferably transferred via a BLUETOOTH low energy ("BLE") radio to a mobile device (preferably a mobile phone such as an iPHONE mobile phone from Apple, Inc. or a GALAXY mobile phone from Samsung, Inc.).

The circuitry inside the golf club preferably activates at impact using a shock switch for power savings. At rest, and after a shot, the golf club continues to send data, and returns to a sleep mode every second until a golfer strikes another golf ball.

Internal circuitry is embedded within the golf ball. The internal circuitry preferably comprises at least a BLUETOOTH Low Energy radio (5th generation), a processor, a magnetometer, an accelerometer, and a battery. The internal circuit may also have a memory. A KIONIX chip is preferred. The 5th generation BLUETOOTH Low Energy radio has a range of at least 700 meters. The battery is preferably a 2032 coin cell. A NF52 Nordic processor is preferably utilized. A KIONIX 3-axis accelerometer is preferably utilized.

Simonds et al., U.S. Pat. No. 9,707,454 for a Limited Flight Golf Ball With Embedded RFID Chip is hereby incorporated by reference in its entirety.

Balardeta et al., U.S. Pat. No. 8,355,869 for a Golf GPS Device is hereby incorporated by reference in its entirety.

Raposo, U.S. Pat. No. 8,992,346 for a Method And System For Swing Analysis is hereby incorporated by reference in its entirety.

Balardeta et al., U.S. Pat. No. 8,845,459 for a Method And System For Shot Tracking is hereby incorporated by reference in its entirety.

Lee et al., U.S. Pat. No. 6,224,493 for an Instrumented Golf Club System And Method Of Use is hereby incorporated by reference in its entirety.

Lee et al., U.S. Pat. No. 6,224,493 for a Diagnostic Golf Club System is hereby incorporated by reference in its entirety.

Gibbs, et al., U.S. Pat. No. 7,163,468 is hereby incorporated by reference in its entirety. Galloway, et al., U.S. Pat. No. 7,163,470 is hereby incorporated by reference in its entirety. Williams, et al., U.S. Pat. No. 7,166,038 is hereby incorporated by reference in its entirety. Desmukh U.S. Pat. No. 7,214,143 is hereby incorporated by reference in its entirety. Murphy, et al., U.S. Pat. No. 7,252,600 is hereby incorporated by reference in its entirety. Gibbs, et al., U.S. Pat. No. 7,258,626 is hereby incorporated by reference in its entirety. Galloway, et al., U.S. Pat. No. 7,258,631 is hereby incorporated by reference in its entirety. Evans, et al., U.S. Pat. No. 7,273,419 is hereby incorporated by reference in its entirety. Hocknell, et al., U.S. Pat. No. 7,413,250 is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims.

Therefore, the embodiments of the invention in which an exclusive property or privilege is claimed are defined in the following appended claims.

I claim as my invention the following:

1. A golf club comprising:
    a golf club head comprising a body comprising a face wall, an inertial motion unit (IMU) positioned within the body and in contact with the face wall, and a BLUETOOTH transceiver in communication with the IMU; and
    a shaft attached to the golf club head;
    wherein the IMU identifies an impact location with a golf ball;
    wherein the impact location is determined based on an impact signature immediately after a golf club head impact with the golf ball;
    wherein each of a plurality of collected impact datasets associated with each impact location is transmitted from the BLUETOOTH transceiver to a neural network configured to resolve impact location from any new dataset.

* * * * *